STORAGE AND RETRIEVAL OF GRAPHIC INFORMATION

Filed July 19, 1966 7 Sheets-Sheet 1

INVENTORS.
JOHN F. CAMERON
GEORGE S. FENN

BY Christie, Parker & Hale
ATTORNEYS.

Dec. 16, 1969 J. F. CAMERON ET AL 3,484,751

STORAGE AND RETRIEVAL OF GRAPHIC INFORMATION

Filed July 19, 1966 7 Sheets-Sheet 2

INVENTORS
JOHN F. CAMERON
GEORGE S. FENN
BY
Christie, Parker & Hale
ATTORNEYS

STORAGE AND RETRIEVAL OF GRAPHIC INFORMATION

Filed July 19, 1966 7 Sheets-Sheet 4

INVENTORS
JOHN F. CAMERON
GEORGE S. FENN
BY
Christie, Parker & Hale
ATTORNEYS

INVENTORS.
JOHN F. CAMERON
GEORGE S. FENN
BY
Christie, Parker & Hale
ATTORNEYS.

INVENTORS
JOHN F. CAMERON
GEORGE S. FENN
BY
Christie, Parker & Hale
ATTORNEYS

STORAGE AND RETRIEVAL OF GRAPHIC INFORMATION

INVENTORS
JOHN F. CAMERON
GEORGE S. FENN
BY
Christie, Parker & Hale
ATTORNEYS

United States Patent Office 3,484,751
Patented Dec. 16, 1969

3,484,751

STORAGE AND RETRIEVAL OF GRAPHIC INFORMATION

John F. Cameron, Palos Verdes Peninsula, and George S. Fenn, Rolling Hills, Calif., assignors to FMA, Inc., Los Angeles, Calif., a corporation of California Filed July 19, 1966, Ser. No. 566,359
Int. Cl. G11b *13/00*
U.S. Cl. 340—172.5 3 Claims

ABSTRACT OF THE DISCLOSURE

In an information storage and retrieval system, an elongated storage medium is provided upon which items of graphic information are recorded and corresponding index information is recorded in predetermined physical relationship to the items of graphic information. Responsive to a match between selection criteria and index information during the transport of the storage medium, an alterable control mark is recorded on the storage medium in predetermined physical relationship to the item of graphic information corresponding to the index information matching the selection criteria. The transport apparatus finds the control mark, thereby precisely positioning the item of graphic information at a utilization station. The control mark may also be used to reflect the activity count of the item of graphic information.

This invention relates to information storage and retrieval and, more particularly, to storage and retrieval of graphic information, i.e. printed matter, drawings, photographs, and the like.

In the last several decades, the volume of graphic information accumulated by businesses, government agencies, and libraries has grown to mammoth proportions, and in the future the outlook is for even more phenomenal growth. Storage of this information imposes a tremendous burden on the physical resources of our society, due to the space it consumes. Furthermore, retrieval and reorganization of the graphic information, including addition to or deletion from files of graphic information, impose a tremendous burden on the human resources of our society due to the extensive manual labor required.

Recent advances in microphotography have contributed much to alleviating the problem of space consumption in the storage of graphic information. Use of microphotographic storage, however, has further accentuated the problems of searching and gaining access to the graphic information, retrieving it, and reorganizing it, because of the minute size of the items of graphic information. As a result, the use of microphotography to store graphic information has increased the burden on human resources.

There are already machines in existence that are capable of recording files of graphic information on a storage medium, and automatically retrieving and reorganizing the files of graphic information according to selection criteria. These machines handle a storage medium, for example reels of photographic film, on which index information describing each item of graphic information is recorded aside of the corresponding item of graphic information. The index information, which is machine-read, provides the link, through which access to the graphic information is gained. Use of an automated system eliminates a great deal of the manual labor associated with storage and retrieval of graphic information. Nevertheless, files of graphic information in the form of "hard copy," full-size documents, as well as reduced microphotos, are for the most part still retrieved and reorganized manually, because the cost to introduce and maintain an automated system is usually more than the savings anticipated through its use.

The existing machines can only handle limited formats of graphic information and corresponding index information. Consequently, utilization of these machines is confined to the restricted number of users, whose information can be reduced to these limited formats. Prospective users having items of graphic information of variable sizes and requiring different degrees of indexing on the same medium, e.g. the same reel of tape, are excluded from using these machines, either by prohibitive cost or by complete inability of the machine. Furthermore, a potential improvement in search and access time and a more efficient utilization of space on the storage medium, which could be attained by a judicious arrangment of information on the medium, are lost because of the limitations on the format.

In addition, the machines themselves are inflexible in their operation. For one thing, a complete machine is often tied up to perform a simple operation involving only a small portion of it. For another thing, the machines are not compatible with equipment external to the system, such as transport and data handling apparatus, which precludes use of external equipment to help perform storage and retrieval operations. In general, the time required to search for and gain access to a desired item of graphic information is prolonged as a result of the inflexibility of these existing machines. Thus, until the present, automatic storage and retrieval apparatus for graphic information has been too expensive for most organizations, especially the smaller ones.

The invention contemplates the recordation of graphic information and corresponding index information on a storage medium in a variable format that is best suited to the particular nature of the graphic and index information in each situation. No limit is imposed on the size of the items of graphic information or amount of index information recorded on a storage medium. According to a feature of the invention, the format of the graphic and index information transferred to the storage medium can be transformed into any desired format and such format can be accommodated by the storage and retrieval system of the invention. As a result, an optimum format can be chosen that provides the best compromise under the circumstances of the particular user between fast access time to the information and efficient utilization of the space on the storage medium.

The invention also contemplates transporting the storage medium at a variable speed and reading information during transport at a variable speed almost reaching a standstill. As a result, search operations involving frequent stops can be executed faster, because searching begins before the medium handling or transport mechanism reaches a specific operating speed.

In addition, the requirement for compatibility among the various components of the system or between the components and the format of the medium is substantially relaxed, particularly with respect to those components involving mechanical operations, such as the medium handling equipment. Thus, existing equipment not intended for storage and retrieval operations may be easily modified to perform such functions.

An important feature of the invention is the utilization of alterable control marks that bear a predetermined physical relationship to the graphic and index information stored on the medium. These control marks establish compatibility between the medium handling mechanism, the variable speed of operation, and the format of the medium, which is also variable, and regulate the execution of the information storage and retrieval operations. Use of these alterable control marks enables execution of information storage and retrieval operations with a minimum of basic modules that can be connected together through a transducer for control marks to perform innumerable operations. Only the modules actually used to perform an operation are in fact, tied up, and thus, equipment not required for the operation is freed.

The control marks can be classified into two groups. One group is associated with the format of the graphic and index information, e.g. identifying the boundaries of various levels of graphic and index information or characteristics of the format affecting utilization of the information. Since these control marks are alterable, they can be rearranged to a new predetermined relationship to suit the particular characteristics of the equipment or application with which the storage medium is to be used. On the other hand, if the index information is itself alterable, the control marks relating thereto are altered with the index information to maintain the predetermined relationship. The other group of control marks is associated with the operation of the equipment, such as control marks indicating items of graphic information whose index information matches selection criteria, counts of the activity of items of graphic information, items of graphic information not matching request criteria to verify the search operation, and items of graphic information flagged for future reference. Control marks of the latter group are utilized to position selected items of graphic information automatically at utilization stations of the system. The functions of the control marks associated with the operation of the equipment are generally more temporary in nature and are frequently altered during the course of the information storage and retrieval operations.

These and other features of the invention are considered further in the following detailed description of the invention taken in conjunction with the drawings, in which:

FIGS. 1A, 1B, and 1C are diagrams illustrating transformations of the format of items of graphic information transferred to a storage medium of the type compatible with the invention;

Figure 1A:
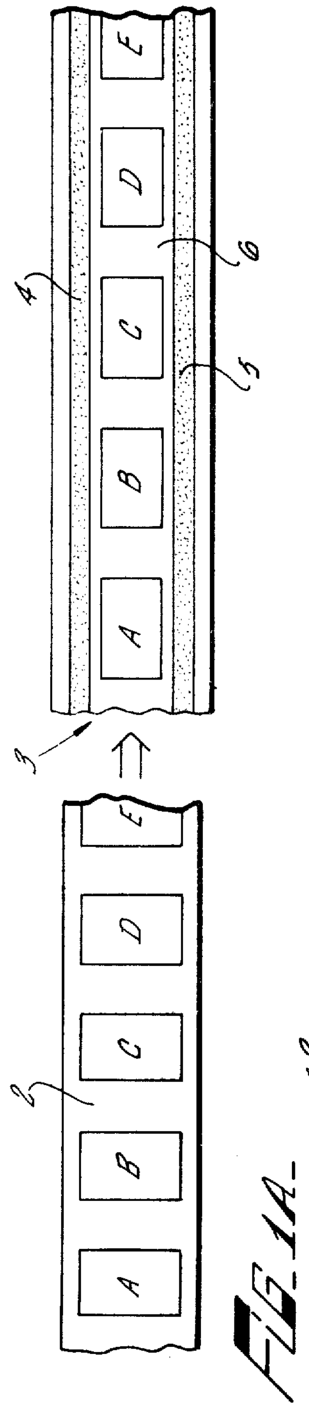

Graphic information is in general organized in a hierarchic arrangement, the nature of which varies widely, depending on the nature of the information and the circumstances of the user. Like any system of classification, the breakdown of the information into the levels of the hierarchy and the names given to these levels are strictly a matter of definition. For the purpose of describing the operation of the invention, and pointing out how it is used and its advantages, exemplary hierarchies of graphic information and index information are defined. The basic unit of graphic information recorded on the storage medium operated upon by the storage and retrieval system of the invention is defined as a frame. Each frame could contain either a plurality of items or pages (e.g. the contents of a microfiche), one item or page, or a fraction of an item or page (e.g. a segment of an engineering drawing). One or more frames constitute a document; one or more documents constitute a record; and one or more records constitute a file, which is the highest, most general level of graphic information in the hierarchy. Assuming that the index information is recorded in the form of a binary code, the basic unit of index information is a bit, i.e. a binary "1" or "0." A fixed number of bits, for example seven bits, makes up an alphabetic or numerical character and a complete index term or descriptor is formed from one or more characters. One or more descriptors are associated with each document. They are recorded on the storage medium in data blocks, the size and form of which are a function of the type of storage medium from which the descriptors are taken and/or the equipment that handles the index data recorded on the medium. Each record and each file could also be provided with one or more descriptors. The level of graphic information to which a descriptor pertains is either indicated by a tag formed by one character of the descriptor or by control marks, as discussed in more detail below.

As a specific example of a hierarchy, graphic information from the insurance industry is considered. A file could be all the records relating to insurance policies within a certain range of policy numbers. A record could be all the documents pertaining to one insurance policy, including the policy itself, amendments to the policy, and correspondence referring to the policy. A frame could be one page of a policy, an amendment, or correspondence. The descriptor associated with a document could be a code number identifying the nature of the document. The descriptors associated with a record could be the name of the insured, the policy number, and the due date of the premium, while the file descriptor could be the range of policy numbers encompassed by the file.

In the following detailed description, the invention is discussed with a long ribbon of flexible material that can be stored on reels serving as the storage medium. The ribbon, hereafter called phototape, has a surface with one or more strips of magnetic material laid along its length to permit magnetic storage of information and an area along its length that is covered with a photographic emulsion to permit recordation of graphic information. Different arrangements of magnetic and photographic strips are possible. One particularly advantageous arrangement for storage of the medium on reels comprises two magnetic strips along the edges of the medium with a photographic area between the strips. Furthermore, the principles of the invention are applicable when other types of storage mediums, such as microfiche, are employed to store graphic and corresponding index information.

Although it is particularly advantageous for the graphic and index information to be located together on the same physical material, they could be on separate materials, so long as a predetermined physical relationship between the graphic and index information is maintained. When a medium capable of storing graphic and index information is discussed in this application, both cases are included. For example, the graphic and index information could be recorded on separate reels of tape transported together to maintain a predetermined physical relationship.

The invention contemplates storage and retrieval of graphic information and corresponding index information in variable formats best suited to the nature of the information and the particular needs of the user. In an automated information storage and retrieval system, in which index information is stored on the same medium with its graphic information, the search speed for a given transport apparatus, and thus the access time to the document, is directly related to the density of the stored documents per unit length of the medium. Thus, by increasing the document density per unit length of the medium, more use can be made of a system, and the cost of operation drops. Under some circumstances, increasing the document density per unit length of the medium leaves large spaces on the medium unoccupied by graphic information, thus requiring a larger amount, i.e. area, of storage medium. According to a feature of the invention, frames of graphic information recorded on the medium handled by the invention can be transformed into any arrangement to attain an optimum format that provides the best compromise between access time and efficient utilization of the space on the storage medium. In so doing, the frames may be of different lengths within the same medium.

Figures 1B, 1C:
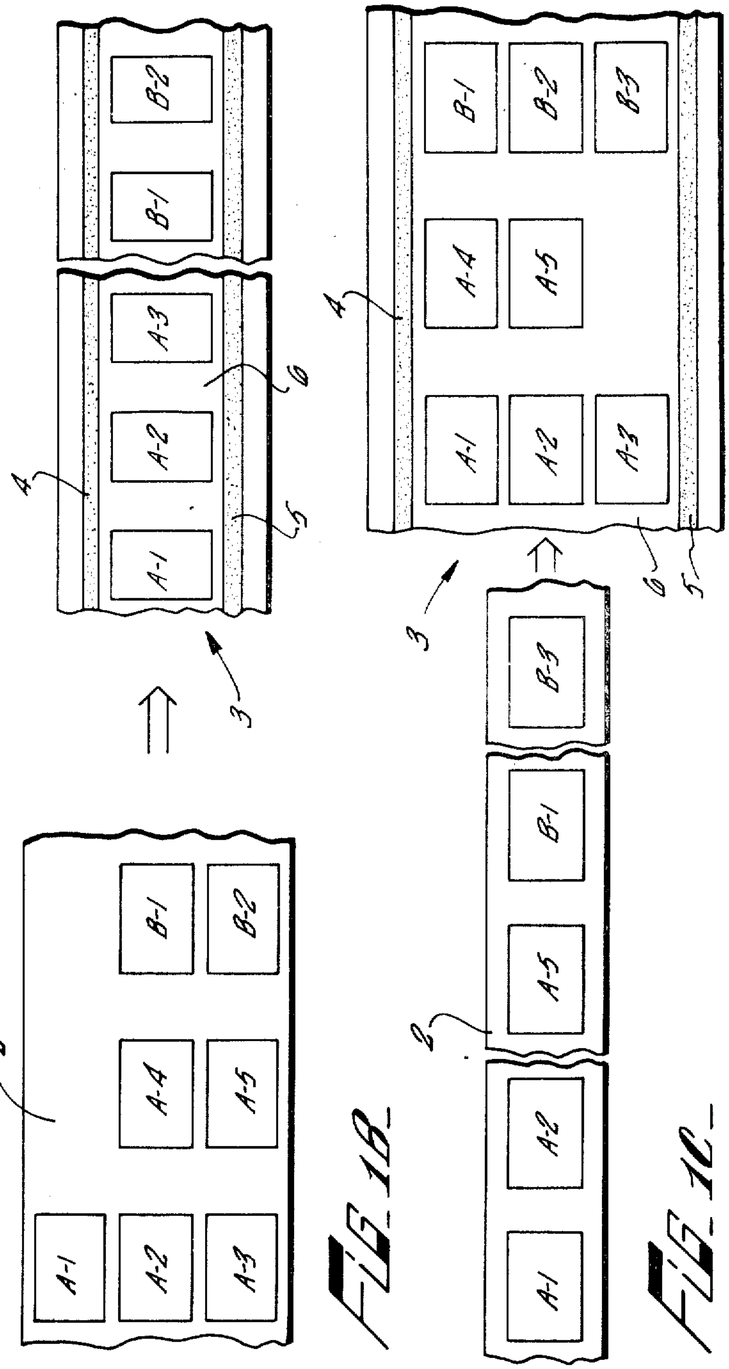

FIGS. 1A, 1B, and 1C illustrate several transformations of the format of graphic information recorded on phototape. The particular arrangement of items of graphic information on the phototape may depend on the space required to record the index information, in that the distance along the length of the phototape reserved for a document must be long enough to record all the index information. In FIG. 1A a roll of microfilm 2 is shown having one-frame documents A, B, C, D, and E. These documents are transferred to a phototape 3 covered with a strip 4 of magnetic material, upon which index information is recorded, a strip 5 of magnetic material, upon which alterable control marks are recorded, and an area 6 between strips 4 and 5 covered with a photographic emulsion, upon which graphic information is recorded. In recording documents A, B, C, D, and E on phototape 3, they are rotated 90 degrees. Such a transformation could be useful, for example, if the distance along strip 4 required to record the index information of each document were as long or longer than the length of the documents. Then, although the document density per unit length of phototape remains the same after the transformation, the area of phototape occupied by the documents is reduced, because a narrower phototape can be utilized.

In FIG. 1B frames A–1, A–2, and A–3 of a document A are shown arranged in one row across microfilm 2 and frames A–4, and A–5 of document A are shown arranged in a second row across microfilm 2. Similarly frames B–1 and B–2 comprising a document B are shown arranged in a third row across microfilm 2. In transformation of the format, these frames are rotated by 90° and recorded on phototape 3 in single file, adjacent to one another. In FIG. 1C frames A–1 through A–5 of a document A and frames B–1 through B–3 of a document B are recorded on microfilm 2 in single file. In recording these frames on phototape 3, frames A–1, A–2, and A–3 are rearranged in one row across the phototape, frames A–4 and A–5 in a second row, and frames B–1, B–2, and B–3 in a third row. The document density per unit of length of the storage medium is increased by rearrangement of the frames in FIG. 1C on phototape 3. As a result, faster access to the graphic information can be achieved.

Since separate index information is associated with each document, frames of different documents are not recorded in the same row. This gives rise to unoccupied spaces on the phototape, thus increasing the amount of phototape, on an area basis, that is consumed in storing the information. The single file arrangement of FIG. 1B is advantageous, for example, if the number of frames in a document varies greatly, because attempts to increase document density per unit length result in inefficient utilization of space on the phototape. Conversely, the arrangement of frames in rows in FIG. 1C is advantageous, if the number of frames in a document is always constant, because the number of frames in a row can be designed to be closely divisible by the number of frames in a document, thereby leaving a minimum of unoccupied space on the phototape. By being able to arrange the frames of graphic information in each case according to the nature of the information, an optimum format is achieved that strikes a balance between these two factors.

Figure 2A:
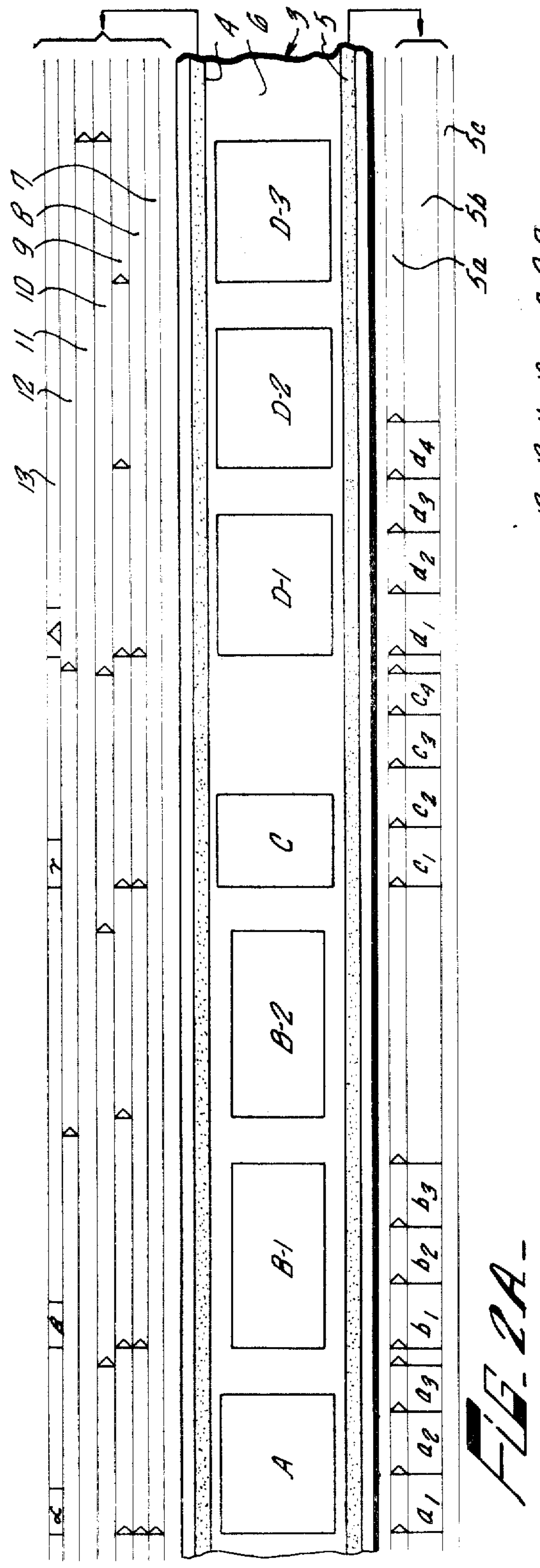
FIGS. 2A and 2B are diagrams illustrating exemplary formats of graphic information and corresponding index information together with control marks, all recorded on a storage medium of the type compatible with the invention.
Figure 2B:
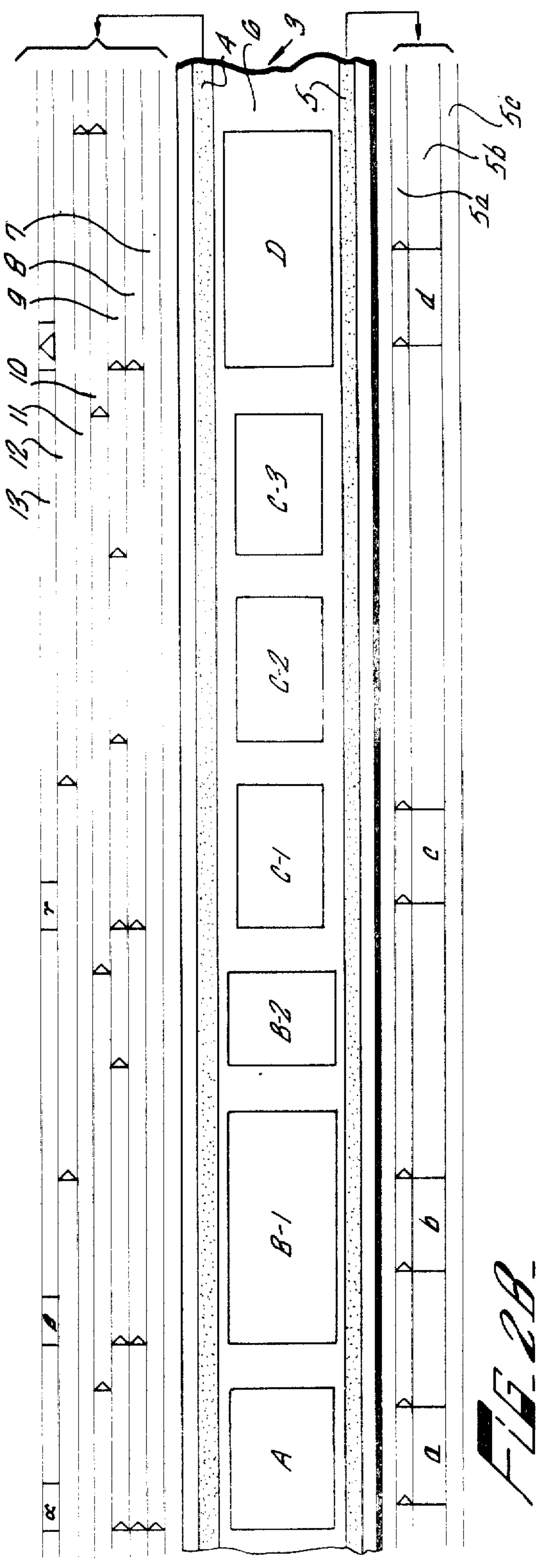

FIGS. 2A and 2B also show pieces of phototape, the purpose of which is to illustrate the nature and functions of the alterable control marks of the invention in the context of several exemplary formats of graphic and index information. Adjacent to magnetic strips 4 and 5, diagrams are represented that show exemplary relative positioning of the magnetically recorded index information and control marks on phototape 3. In FIGS. 2A and 2B each upper-case letter represents a different document and the numbers associated with the upper-case letters represent the frames or rows of frames comprising the document. The alterable control marks are depicted as small triangles. In actuality they could take any form capable of being sensed, including magnetic, electrostatic, etc., and could be a simple slash or more complex, such as binary code. Each lower-case letter represents the area on the tape occupied by the index information corresponding to the document bearing the same upper-case letter. The subscripts on the lower-case letters represent units or blocks of index data that make up the description of each document. These units are not related to the hierarchy of graphic information, but are a function of the capacity of the storage medium, such as index cards, from which the index information is transferred to the phototape and/or the equipment that handles the index data on the phototape. In a typical case, magnetic strip 5 would have three types of information recorded in areas *5a*, *5b*, and *5c* respectively. In area *5b*, seven parallel tracks would run along the length of phototape 3 such that a row of bits across the strip, one from each track, constitutes a character of index data. The index data could be recorded either in an open field or a fixed field. Control marks related to the format of the index data are also recorded on strip 5 to achieve accuracy in the physical relationship between control marks and index data. In area *5a*, control marks, hereafter called timing marks, would be recorded on a single track. Each timing mark would designate the position in area *5b* of a row of index data recorded across strip 5. The timing marks are not shown on track *5a*, because they would be spaced too close together to be visually distinguishable. They are used to locate the position of the rows of index data for reading them, in view of the fact that the phototape is being read during transport at a variable speed, and to control manipulation of the rows of index data, for example, to gate them to a register for storage. In area *5c* control marks would be recorded, designating the beginning and the end of each unit or block of index data. The data block marks are used to adapt the index data recorded on the phototape to the apparatus that handles the index data. For example, if the index data were to be transferred to punched cards for further handling after being read from the phototape, the data block marks would designate the amount of index data to be stored on each card and control the transfer of index data to the cards accordingly. To make the index data on the phototape compatible with another type of data handling equipment, the data block marks are simply altered to establish a new predetermined physical relationship. Similarly, if the index data itself is altered, the timing and data block control marks are also altered to maintain the predetermined physical relationship.

Magnetic strip 4 is represented with seven parallel tracks, labeled 7, 8, 9, 10, 11, 12, and 13, upon which control marks are to be recorded in predetermined relationship to the graphic information. The beginning of the recorded portion of phototape 3 or the beginning of one of a plurality of records could be designated on track 7. On track 8 control marks could be recorded to designate the beginning of documents. Among other uses these control marks help to position the beginning of a document at a utilization station. The beginning of each frame of graphic information could be designated on track 9. The frame control marks are used to position the frames of a document successively at a utilization station either manually or automatically, when it is desired to duplicate or display a document one frame at a time. Track 10 could contain control marks designating the end of a document. These control marks are used to reset comparison circuitry after a document has passed and, with the control marks on track 8, to define the area of the phototape to be duplicated while duplicating a document. On track 11 the end of the recorded portion of phototape 3 or the end of one of a plurality of records could be designated. Record marks are only needed in tracks 7 and 11 if separate index descriptors are provided for records and graphic information is retrieved at the record level. They are used to position the beginning of a record at a utilization station or to define the area of the phototape to be duplicated when a record is copied. On tracks 12 and 13 control marks associated with the operation of the equipment could be recorded. The control marks on track 12 can play many different roles in the course of storage and retrieval operations, such as to flag documents of a special type, documents whose index information matches selection criteria, or, conversely, as a verification of a search operation, documents whose index information does not match selection criteria. The control marks on track 12 can also be used to locate a matching document at a utilization station, which would not otherwise be possible, in view of the variable format of the information recorded on the phototape and the variable speed at which the phototape is transported. Control track 13 contains binary coded numbers in areas on the track that are designated by the Greek letters $\alpha$, $\beta$, $\gamma$, and $\Delta$ and are located adjacent the beginning of each document. Each number gives a count of the activity of the document corresponding to the Greek letter, i.e. the number of times this document has been utilized or reproduced.

In FIG. 2A several blocks of index data are used to describe each document. For example, blocks of index data $a_1$, $a_2$, and $a_3$ correspond to document A. As illustrated, the space required to record the index data corresponding to documents A and C is longer than the length of phototape 3 actually occupied by documents A and C, so the length of the index data determines the length of phototape 3 reserved for the document. In contrast, documents B and D occupy more space than is required to record their index data along the length of phototape 3.

In FIG. 2B a format is shown in which each document has only one index data block. In each case the length of the document, which varies from document to document, is larger than the length of phototape occupied by the index data.

The formats of FIGS. 2A and 2B are only exemplary. There is no limitation on the format of the graphic and index information. The illustrated control marks are also only exemplary. The control marks actually employed depend in part on the format and equipment employed and in part on the particular operations to be performed. When different equipment is used in the system, the control marks may be altered accordingly, while leaving the format of the graphic and index information intact. In many situations, this flexibility permits the modification of external, preexisting equipment to carry out storage and retrieval operations. Similarly, when the format is changed the control marks may also be altered to reflect the change.

Instead of distinguishing the different types of control marks by physical separation on different tracks, the control marks could be recorded on a single track in coded form. In this case, the code would distinguish the different types of control marks.

In some situations it may not be necessary to alter the control marks of the group associated with the format. Unalterable control marks of the group, e.g. photographically recorded, optically readable marks, could in such case be employed with alterable control marks of the group associated with the operation of the equipment.

In addition, if multiple items of graphic information are recorded across phototape 3 transverse to strips 4 and 5 special marks to define the transverse and longitudinal boundaries of each item precisely could be used.

FIGS. 3, 4, 5, and 6 depict the information storage and retrieval system of the invention operating in four basic modes—input or storage, retrieval, complete duplication, and selective duplication. This system is modular in makeup, with the result that only those portions of the equipment actually utilized in a mode are in fact tied up in performing the operation and that the modules are interchangeable in the different modes of operation. The interchangeability of the equipment is demonstrated by the blocks with common names and numbers in FIGS. 3 through 6, which is in each case the same module being used in the different modes. Innumerable modifications of the four disclosed modes of operation can be made to utilize the available equipment best under the circumstances in executing the desired operations.

Figure 3:
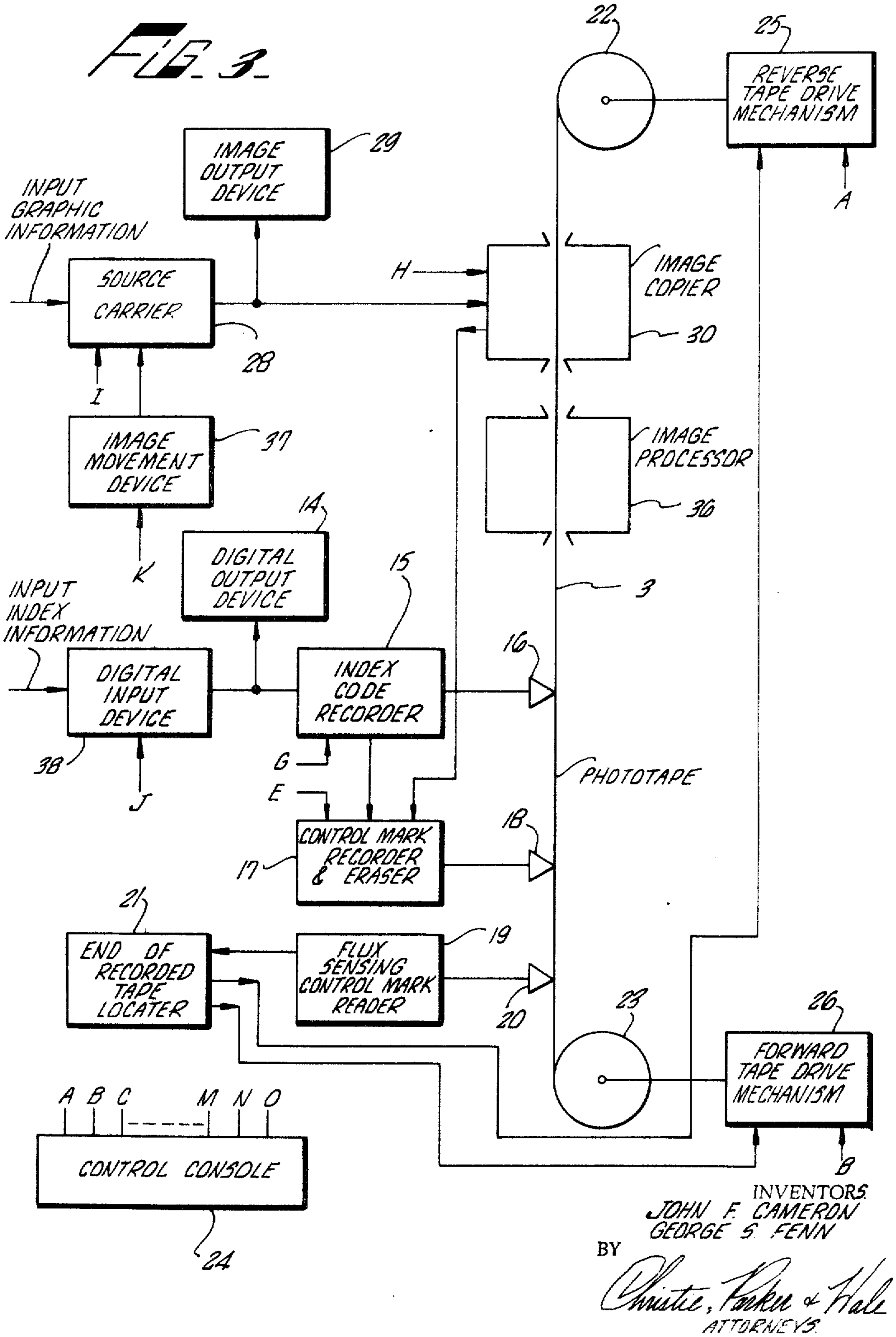
FIG. 3 is a schematic diagram in block form of the storage and retrieval system of the invention operating in an input mode.

In FIG. 3 a modular arrangement is shown that performs in an input or storage mode. Raw, i.e. unexposed phototape 3, on which the graphic and index information is to be recorded, is stored on a reel 22 and taken up by a reel 23 after recordation of the information. A control console 24 has leads A through O that are connected to the various modules so an operator can control their operation manually. Alternatively the operations could be wholely or in part performed automatically. Lead B is connected to a forward tape drive mechanism 26 and lead A is connected to a reverse tape drive mechanism 25, which form part of the transport apparatus. Input graphic information to be recorded on phototape 3 could take any form, including original documents, microfilm, aperture tabulating cards, or microfiche. A source carrier 28, the nature of which depends on the form of the input graphic information, is controlled manually through lead I from control console 24. If the input graphic information were on reels of microfilm, for example, source carrier 28 would be transport apparatus similar to that for phototape 3. An image output device 29 displays the items of graphic information. As the input graphic information is transported by source carrier 28 and the operator observes on image output device 29 an item of graphic information to be recorded, this item is recorded on phototape 3 by an image copier 30 in response to a command transmitted from control console 24 by lead H. The graphic information recorded on phototape 3 is developed by an image processor 36. Use of diazo photographic techniques are particularly advantageous for recordation of the input graphic information on phototape 3, because of the ease with which diazo reproductions can be made. If the input graphic information were on microfilm, image copier 30 could be a continuous contact printer, in which case source carrier 28 and forward tape drive mechanism 26 would be operated in synchronism from control console 24 during the printing operation. According to a feature of the invention, the images of the input graphic information are movable relative to phototape 3. This relative movement could be effected optically by a mirror system or mechanically by moving source carrier 28 or the transport apparatus that supports phototape 3. To this end, an image movement device 37 is connected by lead K to control console 24, where image movement is manually controlled by the operator.

Input index information corresponding to the items of graphic information are handled by a digital input device 38, whose nature depends upon the form of the input index information. If the indexing were to take place at the time of recordation of the items of graphic information on phototape 3, digital input device 38 would be a binary code converting device with an alpha-numeric keyboard from which the operator would key in the index information. On the other hand, if the items of graphic information were preindexed and stored on punched cards, digital input device 38 would be a card translator and reader regulated from control console 24 through lead J. Binary coded index data from digital input device 38 is applied to an index code recorder 15 having a write head 16 that is physically located in proximity to magnetic strip 5 of phototape 3 (FIG. 2). The index data may be monitored and displayed by a digital output device 14 to verify the accuracy of the index data before it is actually recorded on phototape 3. A command from control console 24 is then given through lead G to record the index data.

One class of the alterable control marks recorded on magnetic strips 4 and 5 of phototape 3 (FIG. 2) is associated with the format of the graphic and index information. In the specific example of FIGS. 2A and 2B, these control marks on strip 5 designate rows and blocks of index data and on strip 4 frames, documents, and a record of graphic information. A write head 18 of a control mark recorder and eraser 17 has two sections, one physically located in proximity to tracks *5a* and *5c* of strip 5 and the other in proximity to all the tracks of strip 4 of phototape 3 (FIG. 2). The section for tracks *5a* and *5c* could physically be part of the unit comprising write head 16 if desired. As items of graphic information and their corresponding index information are recorded on phototape 3, signals from image copier 30 indicating the beginning and end of frames, documents, records, or a file and signals from index code recorder 15 indicating rows and blocks of index data are transmitted to control mark recorder and eraser 17 for recordation on the appropriate tracks. Recorder 17 can be considered a transducer for control marks. Indications of the levels of graphic and index information could be recorded in the input storage medium along with the graphic and index information itself and read at the instant of recordation of the respective levels of graphic and index information, so as to locate the control marks exactly with respect to the levels of the information on phototape 3. Instead of automatically recording control marks in response to indications from index code recorder 15 and image copier 30, the control marks could be recorded in whole or in part from control console 24 through lead E by the operator. Thus, the arrangement of FIG. 3 functions to produce manually or automatically a phototape with the format illustrated in FIG. 2A and FIG. 2B from a source of graphic information and corresponding index information.

After the last item of graphic information is recorded on phototape 3, an alterable control mark, which could be the control mark in track 11 in FIGS. 2A and 2B, is recorded on phototape 3 to indicate the end of the recorded portion of the tape. This control mark could be recorded by the operator from control console 24 through lead E. As explained further in connection with the other modes of operation, the "end of recorded tape" mark is utilized to stop search operations and rewind the phototape automatically. Thus, if phototape 3 is removed from the transport apparatus before it is completely occupied by graphic information, spoilage of unexposed phototape is prevented. The "end of recorded tape" mark is also utilized in the input mode to designate the point at which to resume recordation of information after a reel of partially exposed phototape is returned to the transport apparatus. To this end, a read head 20 of a flux sensing control mark reader 19, i.e. a static read head, a head that senses flux as distinguished from changes in flux, is located in close proximity to magnetic strip 4 of phototape 3 (FIG. 2) to sense an "end of recorded tape" mark. Reader 19 can also be considered a transducer for control marks. After a partially occupied reel of phototape is placed on the transport apparatus, forward tape drive mechanism 26 is actuated from control console 24 through lead B. The phototape is driven until read head 20 senses the "end of recorded tape" mark and sends a signal to an end of recorded tape locator 21, which first stops forward tape drive mechanism 26 and then adjusts reverse tape drive mechanism 25 and forward tape drive mechanism 26 by means of a servo loop until the "end of recorded tape" mark is located at read head 20. When the "end of recorded tape" mark is located at read head 20, this condition is indicated by a lamp at block 21. Alternatively, the "end of recorded tape" mark could be located manually by the operator from control console 24. The phototape is driven in the forward direction until the lamp at block 21 indicates that an "end of recorded tape" mark has passed read head 20. Then, reverse tape drive mechanism 25 and forward tape drive mechanism 26 are operated from control console 24 until block 21 indicates that the "end of recorded tape" mark is stationed at read head 20.

Figure 4:
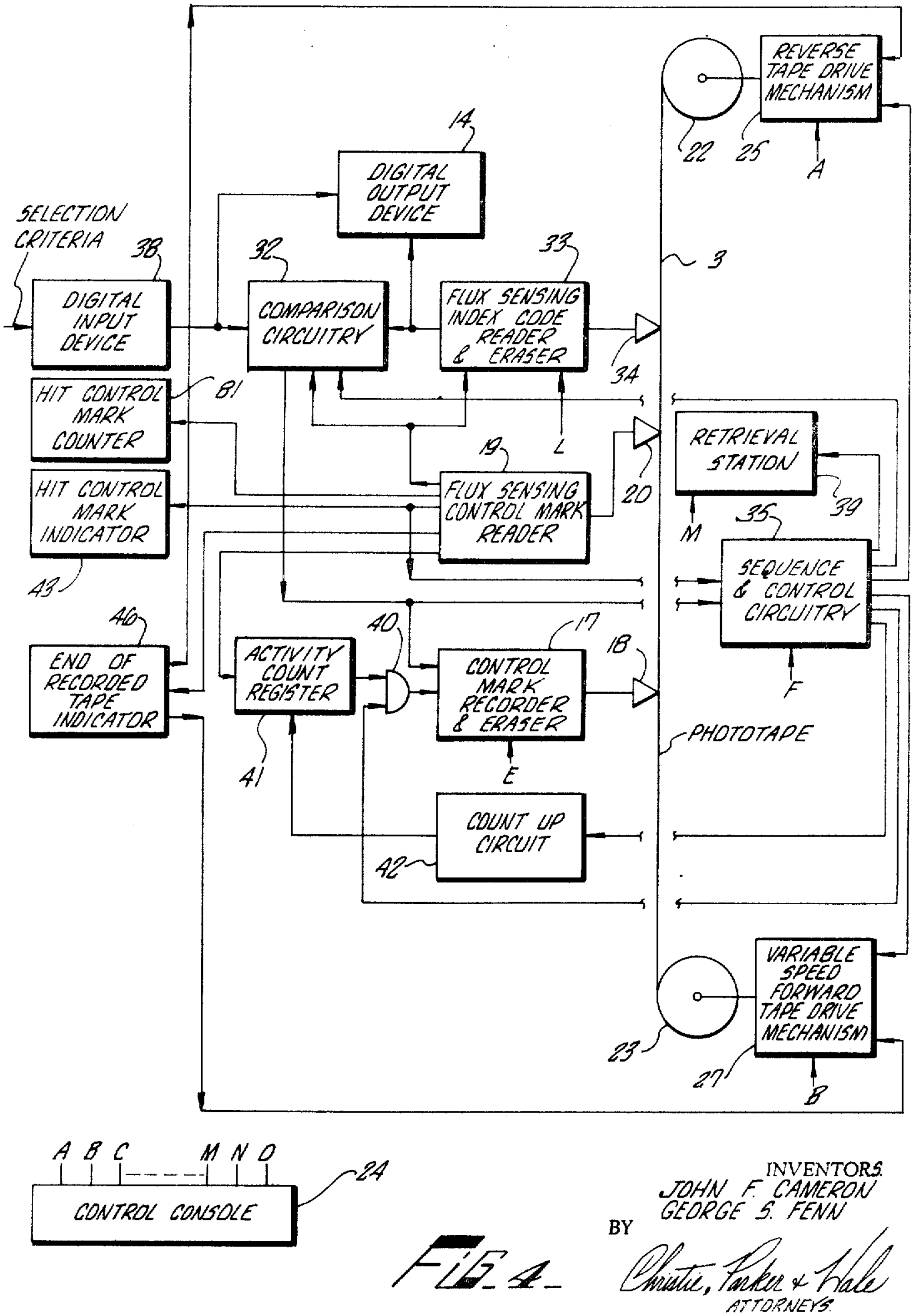
FIG. 4 is a schematic diagram in block form of the storage and retrieval system of the invention operating in a retrieval mode.

In FIG. 4 an arrangement of modules is shown operating in a retrieval mode. Phototape 3, upon which graphic information, index information, and control marks are already recorded, is stored on reel 22, searched by transport apparatus including reverse tape drive mechanism 25 and a variable speed forward tape drive mechanism 27, and taken up by reel 23. The significance of designating block 27 a variable speed tape drive mechanism is that the apparatus for transporting phototape 3 in the retrieval mode can allow for the search speed to vary virtually to standstill and the system accommodates a medium with a variable format driven over a range of transport speeds. Documents are retrieved on the basis of selection criteria fed to digital input device 38, which converts these criteria into binary code for application to comparison circuitry 32. As phototape 3 is transported, a head head 34 of a flux sensing index code reader and eraser 33, i.e. a static read head, senses binary coded index data recorded on magnetic strip 5 of phototape 3 (FIG. 2). Since read head 34 senses flux itself, the search operation can be performed at speeds reaching virtually to standstill. Thus, information is not lost when phototape 3 stops and search can begin immediately again after resumption of tape transport without waiting for the transport apparatus to reach a predetermined operating speed. If the spacing between items of information is sufficiently large so the predetermined operating speed is reached upon resumption of tape transport before the first new item of information, read head 34 can be an ordinary read head responsive to changes in flux. Read head 20 would most likely be a static head in all cases because of the desirability of determining even at standstill, where a hit control mark is. The index data is applied to comparison circuitry 32 for comparison with the selection criteria. Digital output device 14 monitors the index data read from phototape 3 or the selection criteria entered by digital input device 38. Control marks sensed by read head 20 of control mark reader 19 are applied to index code reader 33 and comparison circuitry 32. Like head 18, head 19 has two sections, one physically located in proximity to tracks *5a* and *5c* of strip 5 and the other in proximity to all the tracks of strip 4. Specifically, document marks are applied to comparison circuitry 32 to reset it after the index data corresponding to a document has been read, while the timing marks and code block marks are applied to reader 33 to control the flow of index data to comparison circuitry 32.

The complexity of the selection criteria depends upon the capabilities of comparison circuitry 32. By way of example, comparison circuitry 32 could be provided with the capability of sensing the identity of index descriptors and when an index descriptor lies above a limit and/or below a limit. Furthermore, the selection criteria could involve logical associations of descriptors such as AND, OR, and NOT. Details of circuitry for performing such comparisons with exemplary selection criteria are disclosed in the publication, "User's Guide File Search," published by FMA, Inc., 5730 Arbor Vitae St., Los Angeles, Calif., 1961. The capabilities of comparison circuitry 32 also determine if the index data is recorded in an open field or a fixed field.

When a match between the selection criteria and index data corresponding to a document recorded on phototape 3 occurs, comparison circuitry 32 generates a hit indication signal that is applied to control mark recorder and eraser 17 and sequence and control circuitry 35. In response to the hit indication signal, a write head 18 of recorder 17 produces a hit control mark on track 12 of magnetic strip 4 (FIG. 2) virtually simultaneously with the occurrence of the match. This hit control mark provides a predetermined physical relationship to the matching document. Specifically it lies between the control marks designating the beginning of the matching document and the beginning of the next following document on track 10 of strip 4. Irrespective of the format of phototape 3 or the characteristics of the transport apparatus, the matching document can be found again and located at a retrieval station, such as block 39, by means of the hit control mark, which could be recorded on track 12 of phototape 3 as a short pulse.

Figure 7:
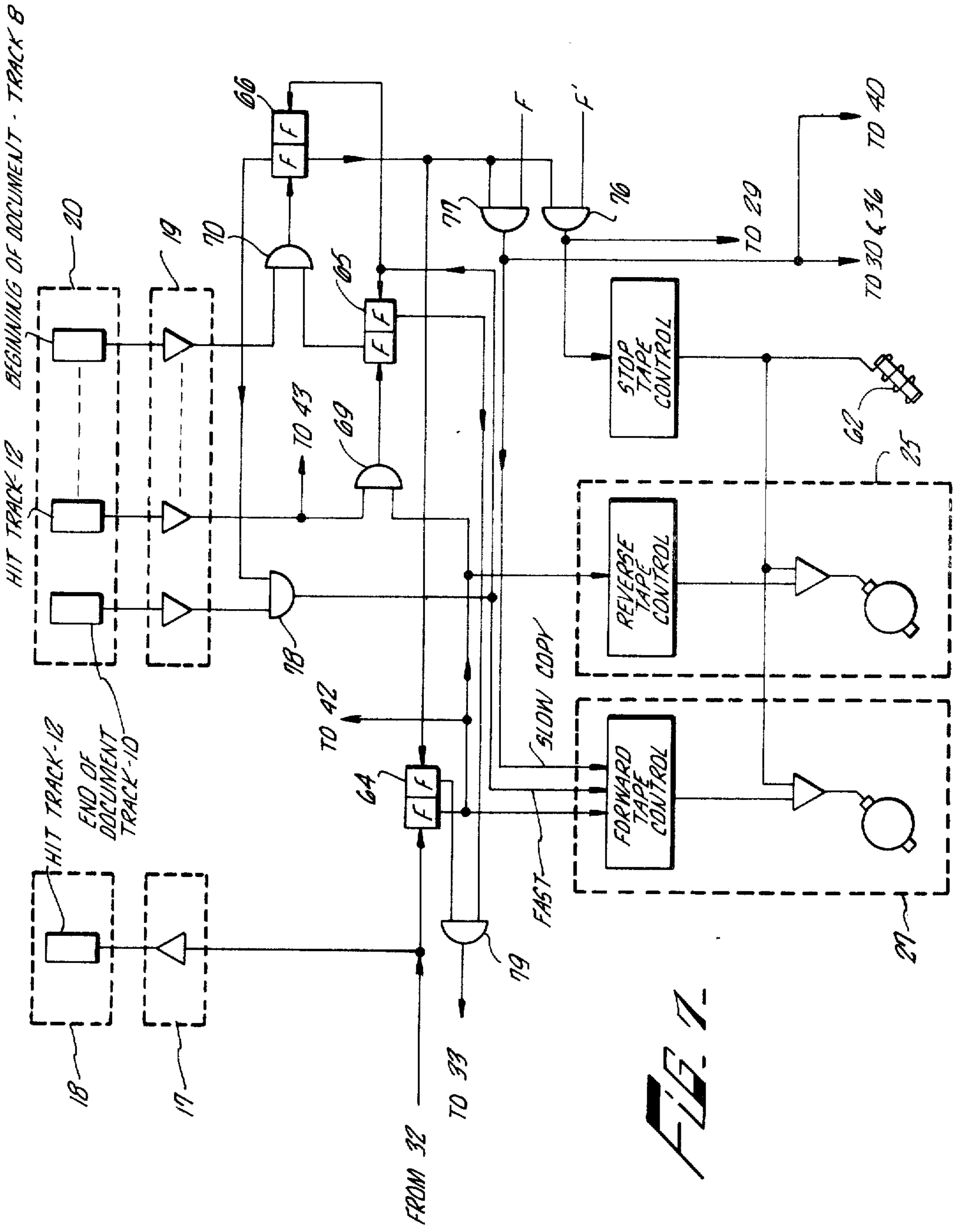
FIG. 7 is a schematic diagram in block form of the sequence and control circuitry of FIG. 4.

The hit indication signal generated by comparison circuitry 32 initiates a sequence of operations in block 35. For a description of this sequence, reference is made to FIG. 7, which shows the detailed circuitry of block 35. A flip-flop 64 is set by the hit indication signal from comparison circuitry 32. One output of flip-flop 64 is connected to an AND gate 79. After flip-flop 64 is set AND gate 79 closes thereby disabling comparison circuitry 32 so comparison is temporarily discontinued during retrieval. The other output of flip-flop 64 is connected to forward tape drive mechanism 27 to stop the forward motion of phototape 3. Tape drive mechanism 27 in general overshoots the matching document by a substantial amount after a match is detected, due to the inertia of the phototape and the transport apparatus. The exact extent of overshoot depends upon the characteristics of the particular transport apparatus being used. The number of documents that pass by after the matching document as a result of overshoot depends on the format of the information on phototape 3. The alterable control mark, however, uniquely designates the matching document irrespective of the characteristics of the transport apparatus or the format of the information. The other output of flip-flop 64 is also connected to reverse tape drive mechanism 25 to initiate the slow reverse motion of phototape 3 and to an AND gate 69. As phototape 3 moves in the reverse direction and read head 20 encounters the hit control mark, control mark reader 19 generates a signal that is transmitted through AND gate 69 to set a flip-flop 65. One output of flip-flop 65 is coupled to an AND gate 70. As phototape 3 continues to move in the reverse direction and read head 20 encounters the control mark designating the beginning of the matching document, control mark reader 19 generates a pulse that is transmitted through AND gate 70 and sets a flip-flop 66. One output of flip-flop 66 is connected to AND gates 76, 77, and 78 and to the reset terminal of flip-flop 64. When flip-flop 66 is set, flip-flop 64 is reset thereby removing the actuating signal from reverse tape drive mechanism 25 and stopping the reverse motion of phototape 3 at the beginning of the matching document.

The matching document can be utilized in different ways, including display or duplication. The form of utilization is selected from control console 25 by either applying an input signal to AND gate 76 over a lead F' or an input signal to AND gate 77 over a lead F. If the matching document is to be reproduced, an input is applied to lead F. Image copier 30 and image processor 36 would in this case serve as retrieval station 39, reproduction taking place as phototape 3 is transported slowly past retrieval station 39 in the forward direction responsive to the output of AND gate 77.

During the search operation, the activity count of each document is read into activity count register 41 (FIG. 4). The count of each document is in turn replaced by the count of the succeeding document until a match occurs. Upon the occurrence of a match, the count contained in register 41 is modified in a predetermined manner. In particular, the signal generated at the output of flip-flop 64 responsive to the hit indication signal actuates a countup circuit 42, which increases the count in register 41 by one. As phototape 3 advances slowly during reproduction the modified activity count passes through an AND gate 40 under the control of the output signal from AND gate 77. Thus, a count of the activity of documents recorded on phototape 3 is maintained in the course of the retrieval operation. Instead of increasing the activity count by one, any other arithmetic operation could be executed.

As phototape 3 moves slowly forward during reproduction, control mark reader 19 generates a signal when read head 20 encounters the control mark on track 10 designating the end of the document. This signal with the output of flip-flop 66 causes a signal at the output of an AND gate 78, which resets flip-flop 65 and 66 and is applied to forward tape drive mechanism 27 to increase the transport of phototape 3 to the normal search speed. When flip-flop 65 becomes reset, a signal is generated at the output of AND gate 79 to enable comparison circuitry 32 again, since flip-flop 64 is already reset. At this point the search operation continues without loss of continuity.

If, on the other hand the matching document is to be displayed, an input is applied to lead F'. Thus, image output device 29, which would in this case serve as retrieval station 39, is enabled, a brake solenoid 62 is actuated and simultaneously an overriding signal is applied to tape drive mechanisms 25 and 27 to ensure that phototape 3 remains stationary during display. After display the operator could proceed as in the case of reproduction, applying an input to lead F. Thus the activity count is modified and the search operation continues.

Sequence and control circuitry 35 can operate in alternative ways to locate a matching document at a retrieval station. What is basic to this aspect of the invention, however, is that a hit control mark is recorded on phototape 3 essentially simultaneously with the occurrence of a match, and this hit control mark is subsequently used to find or locate the matching document.

The operations performed by circuitry 35 could also be carried out manually by an operator from control console 24. In this case sequence and control 35 circuitry is modified from control console 24 through a lead F, so that the only function of circuitry 35 is to stop forward tape drive mechanism 27 after comparison circuitry 32 generates a hit indication signal. The operator manually adjusts reverse tape drive mechanism 25 and forward tape transport mechanism 27 until the hit control mark is located at read head 20. This condition could be signalled by a lamp at a hit control mark indicator 43. Then the operator further adjusts reverse tape drive mechanism 25 until the next control mark designating the beginning of a frame is located at read head 20, which could be signalled by a second lamp at indicator 43. When both lamps were lit, the matching document would be located at retrieval station 39. Finally, after the matching document is utilized at retrieval station 39, the next document is positioned at read head 20, as signalled by a third lamp at indicator 43. The operator can determine on which side of read head 20, i.e. behind or in front, the hit control mark lies at any particular time by noting the direction of tape transport the last time the hit control mark passed read head 20 during the same retrieval operation. If tape transport was in a reverse direction, the hit control mark lies behind read head 20 and vice versa.

Instead of counting the number of times a document is retrieved, the activity counting apparatus could count the total number of copies of a document that are reproduced, in which case each time a document is retrieved the activity count would increase by the number of copies produced. Thus a record of the number of reproduced copies is maintained, which may assist in keeping a record of the number of outstanding copies. Alternatively, the activity count could be given an initial value and reduced by one for each copy reproduced, with no more copies being reproduced after a zero count is reached. This imposes a limit on the number of copies disseminated by the equipment.

When an "end of recorded tape" control mark is detected by read head 20 while searching phototape 3, a signal is generated by control mark reader 19 that is applied to end of recorded tape indicator 46. Indicator 46 lights a lamp to show the operator that the search operation is completed, then stops forward tape drive mechanism 27, and finally actuates reverse tape drive mechanism 25 to rewind phototape 3.

Many modifications of the described retrieval mode are possible. As one possible modification, the entire reel of phototape could be searched without stopping, hit control marks being recorded each time a match occurs. Afterwards, the reel of phototape with hit control marks indicating the matching documents could be head by simple apparatus, such as a microfilm viewer provided with a control mark reader to indicate the position of the control marks. In this way a reel of phototape could first be searched at a very high speed by the more expensive apparatus involving comparison circuitry, an index code reader, etc. and then utilized by a much simpler apparatus. In appropriate situations such a split operation provides a maximum utilization of the equipment involved. The hit control marks can also be employed to flag documents for special treatment or to designate documents not satisfying the selection criteria as a check or verification of the retrieval operation. In connection with verification or another operation, it might be desired to count all these control marks with a counter 81 connected to reader 19. In verification the count should equal the difference of the total documents on a reel minus the retrieved documents. In some applications, it may be desirable to enter the control marks on track 12 manually.

The activity counts recorded on phototape 3 can also be used as the selection criteria. In this case, the arrangement of FIG. 4 can be employed to purge phototape 3 of documents having an activity count falling below a predetermined limit. As the documents falling below the predetermined limit are retrieved, the operator erases the associated index code from control console 24 through lead C. This operation could be carried out automatically by circuitry 35. In this case the output of AND gate 79 provides the erasing signal to recorder and eraser 33. Thus, as far as the equipment is concerned, this document no longer exists. Alternatively the index code could be modified in some other way responsive to the activity count.

Figure 5:
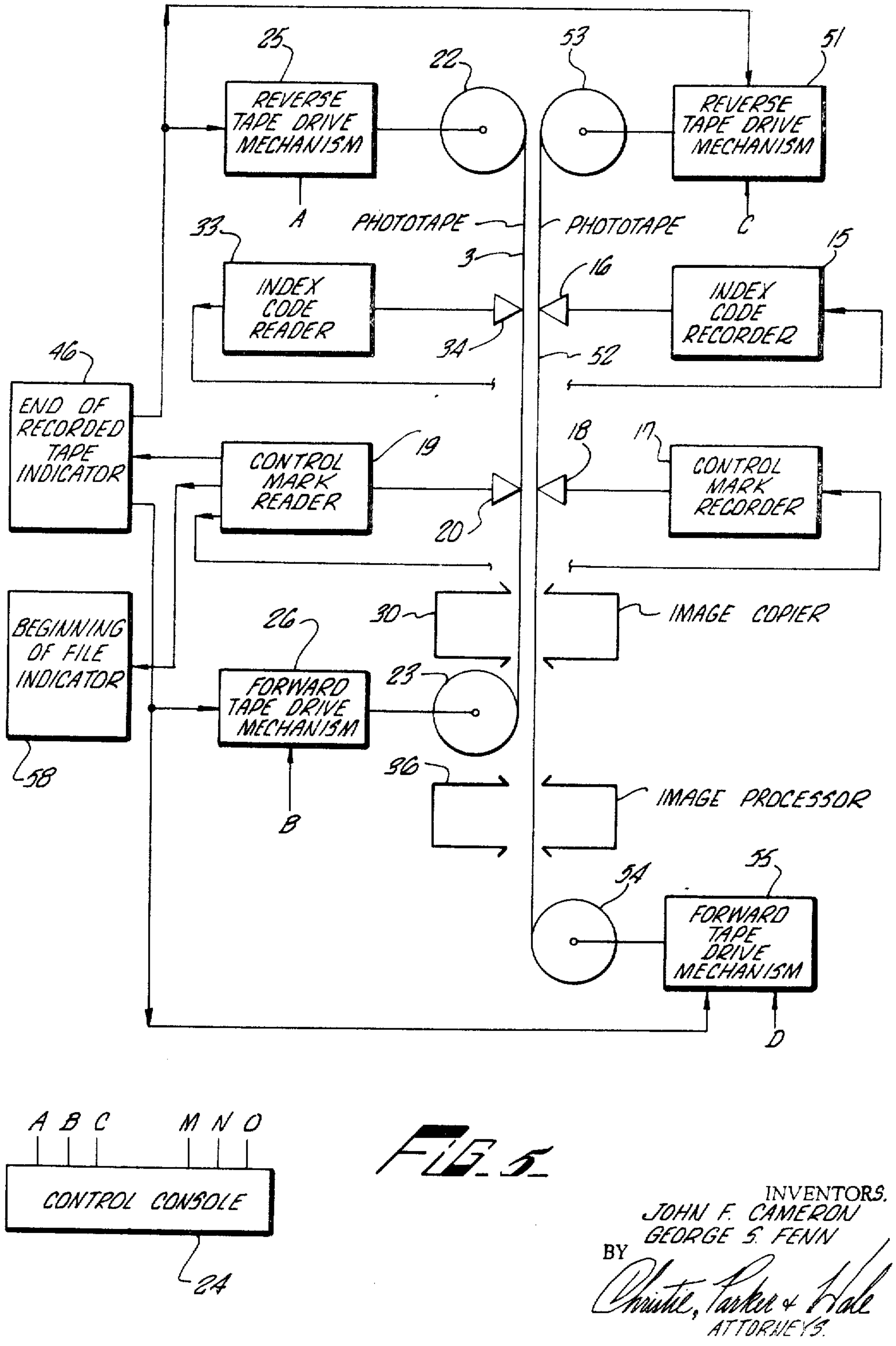
FIG. 5 is a schematic diagram in block form of the storage and retrieval system of the invention operating in a complete duplication mode.

In FIG. 5 an arrangement of modules is shown operating in a complete duplication mode. Phototape 3 stored on reel 22 and taken up on reel 23 is moved by transport apparatus including reverse tape drive mechanism 25 and forward tape drive mechanism 26. The graphic and index information recorded on phototape 3 are exactly duplicated in the same format on a raw phototape 52, which is stored on a reel 53 and taken up on a reel 54. Phototape 52 is moved by transport apparatus including a reverse tape drive mechanism 51 and a forward tape drive mechanism 55, regulated from control console 24 through leads C and D, respectively. After tapes 3 and 52 are placed in position for transport, reverse tape drive mechanism 25 and forward tape mechanism 26 are operated from control console 24 until a control mark designating the beginning of the file (track 7 in FIG. 2) is located at read head 20, as disclosed by a beginning of file indicator 58. This operation could also be performed automatically by a servo loop. Thereafter, forward tape drive mechanism 26 and forward tape drive mechanism 55 are operated at constant speed in synchronism from control console 24. As phototapes 3 and 52 are transported in synchronism, read head 34 of index code reader 33 senses the index data on phototape 3 and transmits it to index code recorder 15 for recordation on phototape 52 by write head 16. Similarly, read head 20 of control mark reader 19 senses the control marks on tape 3 and transmits them to control mark recorder 17 for recordation on phototape 52 by write head 18. Readers 33 and 19 may be of the flux sensing type, but need not be, because the phototape is transported continuously at a constant speed in this mode. Image copier 30 prints the graphic information from phototape 3 onto tape 52 and image processer 36 develops the image printed by copier 30. As phototape 3 is transported, read head 20 of control mark reader 19 senses passage of the control mark designating the end of the recorded portion of the tape. This control mark is transmitted to end of recorded tape indicator 46, which turns on a lamp indicating execution of the complete duplication operation, then stops forward tape drive mechanisms 26 and 55, and finally actuates reverse tape drive mechanisms 25 and 51 to rewind phototapes 3 and 52, respectively.

Figure 6:
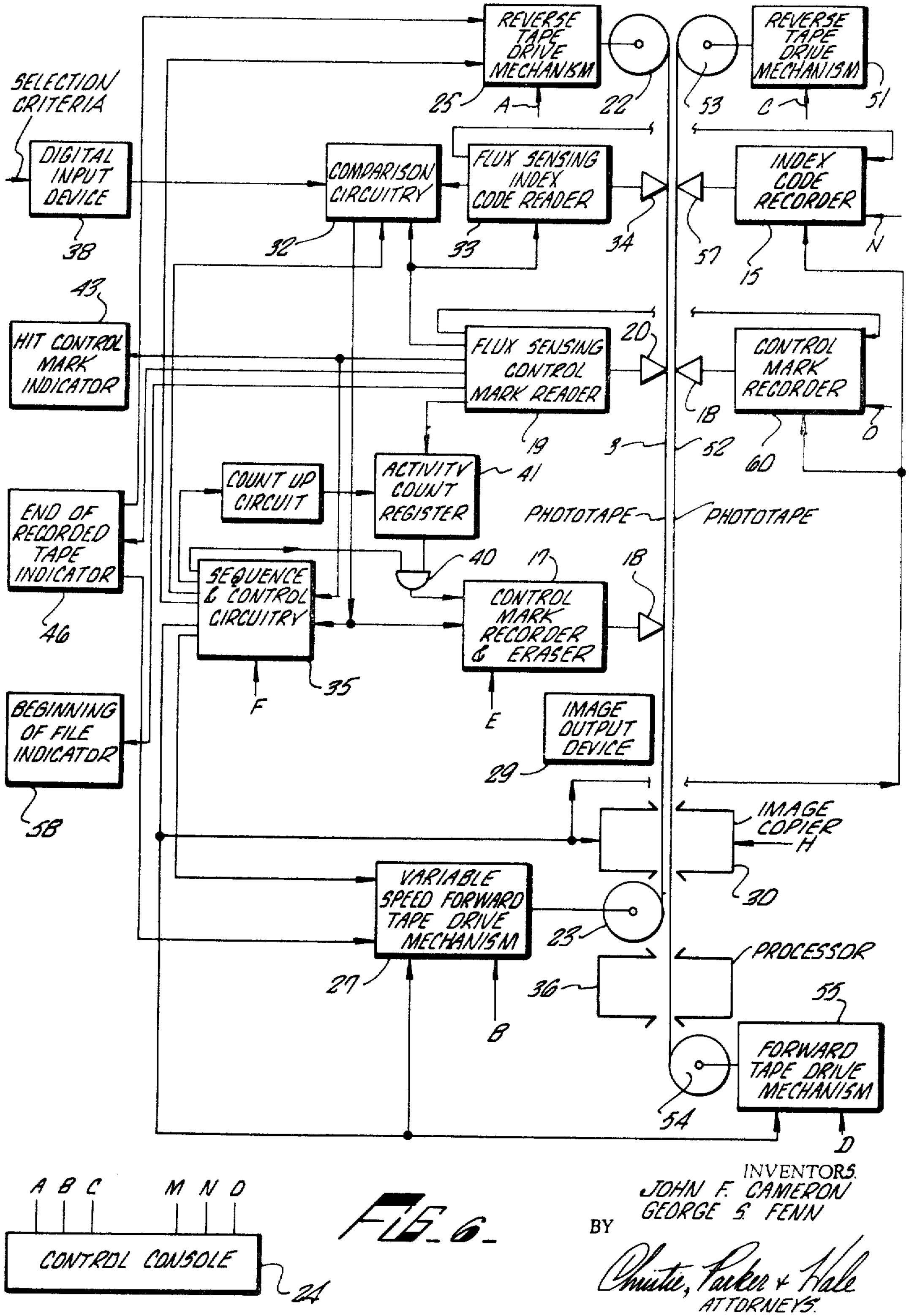
FIG. 6 is a schematic diagram in block form of the storage and retrieval system of the invention operating in a selective duplication mode.

In FIG. 6 an arrangement of modules is shown operating in a selective duplication mode. This mode is a hybrid of the retrieval and complete duplication modes. It involves retrieval of documents matching selection criteria, and duplication of these documents on another phototape. As used in this specification, operation in the selective duplication mode is also considered retrieval. In operation, phototape 3 stored on reel 22 is searched and taken up on reel 23, while phototape 52 stored on reel 53 and taken up on reel 54 remains stationary. Selection criteria are applied to digital input device 38. The resulting binary code is compared in comparison circuitry 32 with the index data on phototape 3, which is sensed by read head 34 of flux sensing index code reader 33. The control marks on phototape 3 are sensed by read head 20 of flux sensing control mark reader 19 and transmitted to comparison circuitry 32 and code reader 33, in which they control the comparing and reading functions, as discussed in connection with FIG. 4. When a match between the selection criteria and the index data corresponding to a document on phototape 3 occurs, circuitry 32 generates a hit indication signal that is applied to control mark recorder and eraser 17 and sequence and control circuitry 35. As a result, write head 18 records a hit control mark on track 12 of magnetic strip 4 (FIG. 2) at a point between the two control marks desginating the beginning of the matching document and the beginning of the next document thereafter. Application of the hit indication signal generated by comparison circuitry 32 to sequence and control circuitry 35 initiates the same sequence of operations as that described in connection with sequence and control circuitry 35 in FIG. 4. Thus forward tape drive mechanism 27 is stopped, the next control mark designating the beginning of a document encountered after the hit control mark is positioned at read head 20, and a utilization signal is generated to initiate reproduction. In this case, instead of being applied to a retrieval station such as block 39 in FIG. 4, the utilization signal starts forward tape drive mechanisms 27 and 55 to transport phototape 3 and phototape 52 in synchronism at a constant slow speed during duplication and activates image copier 30, index code recorder 15, and control mark recorder 60 to duplicate the matching document, its index data, and its control marks on phototape 52. The printed document is developed in processor 36. The utilization signal is maintained by circuitry 35 until the control mark designating the end of a document is sensed by read head 20, at which time index code recorder 15, control mark recorder 17, and image copier 30 are deactivated. During the duplicating operation the document is monitored by image output device 29. After the control mark designating the end of the matching document is sensed by read head 20, circuitry 35 increases tape transport to the normal search speed and the search operation continues. As in the case of the arrangement of FIG. 4, circuitry 35 also controls the storage of the activity count of the matching document in activity count register 41, actuation of count up circuit 42 to modify the count, and application of the modified count to phototape 3.

Alternatively, location of a matching document and duplication can be regulated manually by the operator from control console 24 through leads A, B, C, D, E, F, N and O. This is accomplished by modifying circuitry 35 from control console 24 through lead F, so that the only function of circuitry 35 is to stop forward tape drive mechanism 27. Location of the hit control mark and the beginning of the matching document are sensed by hit control mark indicator 43.

As the end of the recorded portion of phototape 3 is reached in the course of the search operation, the control mark designating the end of the file (track 7 in FIG. 2) is sensed by read head 20. As a result, end of recorded tape indicator 46 is actuated, first lighting a lamp, then stopping forward tape drive mechanism 27, and finally starting reverse tape drive mechanism 25 to rewind phototape 3.

As in the complete duplication mode of FIG. 5, a control mark designating the beginning of the file can be located by block 58, when reel 22 of phototape 3 is initially placed in position on the tape transport apparatus.

As in the input mode of FIG. 3, when a partially occupied phototape 52 is placed in position on the tape transport apparatus, the point at which to resume recordation is found by end of recorded tape locator 21 (not shown in FIG. 6) in response to an end of recorded portion control mark.

A split operation is also advantageous in some situations involving a selective duplication mode. The entire reel of phototape could be searched without stopping, hit control marks being recorded each time a match occurs. Then the documents of the phototape could be selectively duplicated onto microfilm or other medium without comparison circuitry by sensing the control marks. Finally, the microfilm containing only the matching documents with or without index data could be utilized by a simple microfilm viewer or other compatible viewing equipment.

The arrangement of FIG. 6, operating in the selective duplication mode, can also be used to purge a file of documents not satisfying a minimum activity, as designated by the counts corresponding to the documents recorded on phototape 3. The minimum activity count is applied to digital input device 38 as the selection criteria and the new file, purged of the inactive documents, is produced on phototape 52.

In graphic information is recorded in image copier 30 of FIGS. 3, 5, and 6 by contact printing, the apparatus for bringing film together that is disclosed in Patent 3,161,120 of N. R. Timares et al., issued Dec. 15, 1964 and assigned to the assignee of the present application could be used to advantage. In this patent, contact between two films on reels is established and maintained by air pressure created by two opposed, perforated platens, between which the films pass.

In each case, the control marks of FIG. 2 are shown adjacent to the points on phototape 3 that they designate. Depending upon the particular characteristics of the equipment being used, the control marks could instead be offset from the points which they designate in a predetermined pattern. For example, offsetting the control marks compensates for the physical separation of the various modules, such as the read and white reads, the image copier, and the retrieval station. Since the control marks are alterable, they can be changed from one predetermined physical relationship to the information, e.g. adjacent the points they designate, to another predetermined physical relationship to the information, e.g. offset, to provide compatibility between the format of the phototape and the characteristics of different pieces and arrangements of equipment.

Although the invention is illustrated with phototape serving as the storage medium, the principles apply as well to other types of storage mediums. The different operations that can be carried out in accordance with the invention and the formats of graphic information, index information, and control marks, are limitless. The concepts that are basic to the invention however are, the format of the graphic and index information may be variable to suit the particular nature of the information and needs of the user, the storage medium may be transported and read at variable speeds reaching virtually to standstill, and alterable control marks bearing a predetermined relationship to the graphic and index information on the medium are utilized, thereby providing compatibility between the format of the information on the medium and the equipment and allowing more flexibility in the use of modules to perform information storage and retrieval operations.

What is claimed is:

1. In an information storage and retrieval system, the combination comprising:
   (a) a storage medium upon which items of graphic information are recorded, corresponding index information is recorded in predetermined physical relationship to the items of graphic information, and alterable control marks are recorded in predetermined physical relationship to the items of graphic information in a manner such that said control marks can be altered when desired;
   (b) means for transporting the storage medium;
   (c) means for comparing the index information on the storage medium with selection criteria; and
   (d) means responsive to a match between the selection criteria and the index information corresponding to an item of graphic information for recording a said alterable control mark on the storage medium in predetermined physical relationship to the item of graphic information corresponding to the matching index information whereby said control mark is altered for each such compare match.

2. The combination of claim 1, comprising the following additional elements:
   (a) a utilization device;
   (b) means responsive to a match between the selection criteria and index information for stopping the transport of the storage medium; and
   (c) means for positioning the recorded control mark, in response to the match, in a predetermined physical relationship with respect to the utilization device so the item of graphic information can be utilized.

3. The combination of claim 1, in which:
   (a) said control marks are recorded on the storage medium so that they represent an activity count of each item of graphic information;
   (b) said means responsive to the match between the selection criteria and index information also reads said recorded activity count of the item of graphic information which corresponds to the matching index information;
   (c) means is provided for updating said read activity count by modifying said reading thereof by one; and
   (d) said match responsive means records the modified activity count on the storage medium in place of the activity count which was previously read.

References Cited

UNITED STATES PATENTS

| | | | |
|---|---|---|---|
| 2,295,000 | 9/1942 | Morse | 340—172.5 XR |
| 2,596,741 | 5/1952 | Tyler et al. | |
| 2,947,978 | 8/1960 | Poylo et al. | 340—172.5 XR |
| 3,075,178 | 1/1963 | James | 340—172.5 |
| 3,098,119 | 7/1963 | Lemelson | 340—172.5 XR |
| 3,144,637 | 8/1964 | Adams et al. | 340—172.5 |
| 3,241,120 | 3/1966 | Amdahl | 340—172.5 |
| 3,323,119 | 5/1967 | Barcomb et al. | 340—172.5 |

PAUL J. HENON, Primary Examiner

HARVEY E. SPRINGBORN, Assistant Examiner